(12) United States Patent
Bittner

(10) Patent No.: US 9,782,783 B2
(45) Date of Patent: Oct. 10, 2017

(54) COUPLING DEVICE FOR A LABORATORY CENTRIFUGE ACTUATED BY CENTRIFUGAL FORCE

(71) Applicant: Sigma Laborzentrifugen GmbH, Osterode (DE)

(72) Inventor: Matthias Bittner, Goettingen (DE)

(73) Assignee: SIGMA LABORZENTRIFUGEN GMBH, Osterode (DE)

( * ) Notice: Subject to any disclaimer, the term of this patent is extended or adjusted under 35 U.S.C. 154(b) by 0 days.

(21) Appl. No.: 14/918,624

(22) Filed: Oct. 21, 2015

(65) Prior Publication Data

US 2016/0107171 A1    Apr. 21, 2016

(30) Foreign Application Priority Data

Oct. 21, 2014 (EP) .................................... 14189739

(51) Int. Cl.
| | |
|---|---|
| *B04B 9/08* | (2006.01) |
| *F16D 1/116* | (2006.01) |
| *F16D 43/16* | (2006.01) |
| *F16D 43/18* | (2006.01) |
| *B04B 7/02* | (2006.01) |

(52) U.S. Cl.
CPC ................ *B04B 9/08* (2013.01); *F16D 1/116* (2013.01); *F16D 43/16* (2013.01); *B04B 2007/025* (2013.01); *B04B 2009/085* (2013.01); *F16D 43/18* (2013.01)

(58) Field of Classification Search
CPC ........ B04B 9/08; B04B 2009/085; B04B 9/00

USPC ............... 494/12, 16, 20, 33, 38, 64, 84, 85; 210/232

See application file for complete search history.

(56) References Cited

U.S. PATENT DOCUMENTS

| | | | | |
|---|---|---|---|---|
| 2,329,499 | A * | 9/1943 | Weaver ................... | D01D 7/02 57/77 |
| 5,681,257 | A * | 10/1997 | Letourneur ............... | B04B 9/08 403/325 |
| 6,063,018 | A * | 5/2000 | Letourneur ............... | B04B 9/08 403/327 |
| 8,678,987 | B2 * | 3/2014 | Henne ....................... | B04B 9/08 494/12 |
| 8,852,070 | B2 * | 10/2014 | Peters ....................... | B04B 9/08 494/12 |
| 9,339,824 | B2 * | 5/2016 | Henne ....................... | B04B 9/08 |
| 9,452,436 | B2 * | 9/2016 | Ballhause ................. | B04B 9/00 |
| 9,539,588 | B2 * | 1/2017 | Le Guyader ............. | B04B 9/08 |

(Continued)

FOREIGN PATENT DOCUMENTS

| | | |
|---|---|---|
| DE | 10 2012 011 531 A1 | 12/2013 |
| JP | S56 164040 U | 5/1955 |

(Continued)

*Primary Examiner* — Charles Cooley
(74) *Attorney, Agent, or Firm* — Thomas | Horstemeyer, LLP

(57) ABSTRACT

The invention relates to a laboratory centrifuge (1) with a coupling device (4) actuated by a centrifugal force. According to the invention an eccentric mass (22), especially a roller (23), is guided through a guideway (26) and preferably another guideway (27, 32) in such a way that the centrifugal force (46) of the eccentric mass (22) is deflected in such a way that a coupling force is generated which presses a coupling element (24) radially inwards against the outer surface of a drive shaft (3).

20 Claims, 10 Drawing Sheets

(56) References Cited

U.S. PATENT DOCUMENTS

| | | | | |
|---|---|---|---|---|
| 2011/0212822 A1* | 9/2011 | Henne | ................ | B04B 9/08 |
| | | | | 494/84 |
| 2013/0188894 A1* | 7/2013 | Peters | ................ | B04B 9/08 |
| | | | | 384/91 |
| 2013/0203581 A1* | 8/2013 | Le Guyader | ............ | B04B 7/02 |
| | | | | 494/10 |
| 2013/0237399 A1* | 9/2013 | Letourneur | ............ | B04B 9/08 |
| | | | | 494/10 |
| 2013/0331253 A1* | 12/2013 | Ballhause | ............... | B04B 9/00 |
| | | | | 494/84 |
| 2014/0329658 A1* | 11/2014 | Le Guyader | ............ | B04B 9/08 |
| | | | | 494/82 |
| 2014/0349829 A1* | 11/2014 | Todteberg | ............ | B04B 5/0414 |
| | | | | 494/60 |
| 2015/0231648 A1* | 8/2015 | Henne | ................ | B04B 9/08 |
| | | | | 494/84 |
| 2015/0343459 A1* | 12/2015 | Ballhause | ............... | B04B 9/00 |
| | | | | 494/43 |
| 2016/0107171 A1* | 4/2016 | Bittner | ................ | B04B 9/08 |
| | | | | 494/84 |
| 2016/0158769 A1* | 6/2016 | Hornek | ................ | B04B 9/08 |
| 2017/0050194 A1* | 2/2017 | Hornek | ................ | B04B 7/06 |

FOREIGN PATENT DOCUMENTS

| | | | | |
|---|---|---|---|---|
| JP | 2008126130 A | | 6/2008 | |
| JP | 2010-142696 A | | 7/2010 | |
| WO | WO 8304379 A1 * | 12/1983 | ......... | B04B 5/0414 |
| WO | 2010/025922 A1 | | 3/2010 | |
| WO | 2011/001729 A1 * | 1/2011 | | |
| WO | 2011/054901 A1 | | 5/2011 | |
| WO | 2011/054906 A1 | | 5/2011 | |
| WO | 2012/059151 A1 | | 5/2012 | |

\* cited by examiner

COUPLING DEVICE FOR A LABORATORY CENTRIFUGE ACTUATED BY CENTRIFUGAL FORCE

CROSS REFERENCE TO RELATED APPLICATIONS

This application claims priority to co-pending European patent application No. EP 14 189 739.7 entitled "Centrifugal Force Actuated Coupling Device for a Laboratory Centrifuge" filed Oct. 21, 2014.

FIELD OF THE INVENTION

The invention relates to a coupling device for a laboratory centrifuge actuated by centrifugal force. Furthermore, the invention relates to a laboratory centrifuge with such a coupling device actuated by centrifugal force.

BACKGROUND OF THE INVENTION

Laboratory centrifuges have a rotor, which has receptacles distributed over its circumference. Into these receptacles vessels can be inserted in which substances to be treated by centrifuging are stored. To cause the rotor with the vessels with the substances accommodated in the receptacles to rotate with a rotation required for the centrifuging, an output element of the rotor is coupled with a driving element of the laboratory centrifuge, usually formed by a driving shaft, driven by a motor. In this context the coupling device serves for axially securing the output element on the driving element and therefore serves for axially securing the rotor on the driven driving shaft. It is possible that the coupling device also serves for a form-locking transmission of the driving moment from the driving shaft to the rotor. Preferably, the transmission of the driving moment is achieved through a friction-locking of coupling surfaces, where the contact force of the coupling surfaces may be dependent on a weight of the rotor and a force component of a coupling force. High demands have to be made to the operational safety of the coupling device especially due to aerodynamic effects resulting from high revolution speeds, the high centrifugal forces, gyro effects at substantive impacts upon the laboratory centrifuge and the like.

In laboratory operation of the laboratory centrifuge as intended, repeated mounting and demounting of the rotor is necessary to be able to successively examine a plurality of vessels with substances to be centrifuged with the same rotor or different rotors. In this context it has emerged that in view of the effort of manual operation and the time consumption connected therewith, but also in view of the operational safety, the use of manually operated coupling devices may be disadvantageous. For this reason coupling devices operated by centrifugal force are used in which the output element of the rotor is merely set onto the driving element of the laboratory centrifuge driven by the motor. While in the beginning only a friction locking between driving element and output element due to the weight of the rotor causes the coupling between the driving element and the output element, with increasing rotational speed of the rotor due to the centrifugal force the coupling force of the coupling device operated by centrifugal force increases. The larger the rotational speed is, the larger the coupling force generated by the centrifugal force is automatically. While centrifuging is being ended, the driving shaft can be braked, in which way the coupling device operated by centrifugal force is unlocked automatically. (A manually-operated coupling device may be employed in addition to such a coupling device actuated by centrifugal force.)

From U.S. Pat. No. 6,063,018 a laboratory centrifuge is known in which a driving element with a driving surface in the shape of a truncated cone is driven by a motor. The rotor has a corresponding inner friction surface in the shape of a truncated cone with which the rotor due to its weight is pressed onto the friction surface of the driving element having the shape of a truncated cone. When the driving motion of the driving element begins, the friction force between the friction surfaces results in a transmission of the rotational motion to the rotor. In a transverse plane of the driving element, distributed on the circumference and lying opposite of each other, two coupling levers are supported in such a way as to be pivotable outwards due to the centrifugal force. Coupling surfaces of the coupling levers inclined with respect to the transverse direction of the driving element are pressed onto corresponding opposite coupling surfaces of the rotor due to the centrifugal force. In this way on the one hand a form-locking axial securing of the rotor on the driving element is caused. Due to the inclination of the coupling surfaces and the opposite coupling surfaces, the centrifugal force leads to an axial force component dependent on the speed of rotation, which increases the contact force of the friction surfaces in the shape of a truncated cone towards each other with increasing speed of rotation. After positioning the rotor onto the driving element, springs already press the coupling levers radially outwards, in which way even without rotation a locking of the rotor is achieved. For an unlocking of the rotor a manual actuation of a button is necessary, which leads to a motion of the coupling levers radially inwards with an accompanying unlocking of the coupling device.

A corresponding solution is known from WO 2010/025922 A1 (corresponding to U.S. Pat. No. 8,678,987 B2).

DE 10 2012 011 531 A1 (corresponding to US 2013/0331253 A1) discloses a driving head for a laboratory centrifuge, in which a coupling device is employed the effect of which is at least augmented by centrifugal force. The driving head comprises a motor-driven base body, to which during operation of the laboratory centrifuge a hub connected to a rotor of the laboratory centrifuge is detachably connected. On the hub there are at least two coupling levers different from each other, which each are pivotable around an axis parallel to the rotational axis of the laboratory centrifuge. In a standstill of the centrifuge, the coupling levers are pivoted into the base body or are under an outward bias caused by a spring. The hub is slid onto the base body until suitably formed undercuts in the hub each lie opposite to the coupling levers. At rotation of the laboratory centrifuge, the eccentrically arranged coupling levers due to the centrifugal force pivot outwards around their pivot axis and into the corresponding undercut in the hub. The undercuts at the lower edge, which is in contact with the coupling lever, are formed in such a way that with a pivoting movement of the coupling levers the hub is pressed in an axial direction onto the base body and connected with it in a friction-locking way.

While for the aforementioned embodiments the coupling lever is supported on the driving element and pivoted in a transverse plane of the driving element, WO 2011/001729 A1 discloses an embodiment in which the coupling lever is supported on the output element of the rotor for being pivoted in a plane including the rotational axis. Due to the centrifugal force the coupling lever is pivoted radially outwards, where it engages in an undercut of a front-facing recess of a driving shaft.

The embodiments known from U.S. Pat. No. 6,063,018, WO 2010/025922 A1 and WO 2011/001729 A1 are based on a pivoting of a locking catch of a coupling lever in outward direction due to the centrifugal force. However, an inwards locking motion of a locking catch of a coupling lever could also be of interest, for instance to lock a coupling lever supported on the rotor with a groove of a driving shaft. For the "deflection" of the centrifugal force required to exert a bias in radial inward direction onto the locking catch, locking levers are used, at which the center of gravitation is located radially outwards of a pivoting axis of the locking lever, while the locking catch of the locking lever is located radially inwards from the pivoting axis. Examples of such embodiments may be taken from the documents WO 2011/054901 A1 (corresponding to US 2013/0203581 A1), WO 2011/054906 A1 (corresponding to US 013/0237399 A1) and WO 2012/059151 A1 (corresponding to U.S. Pat. No. 8,852,070 B2).

With the novel coupling device actuated by centrifugal force and laboratory centrifuge with such a coupling device actuated by centrifugal force, it is possible to achieve an alternative design of a coupling device actuated by centrifugal force or a laboratory centrifuge with such a coupling device actuated by centrifugal force, respectively. The novel coupling device or laboratory centrifuge might be improved especially with regard to the building effort,
the operational strength and/or
the coupling characteristic.

SUMMARY OF THE INVENTION

A coupling device actuated by centrifugal force with a coupling lever according to prior art might in some cases be disadvantageous, because the pivotable support of the coupling lever necessitates additional bearing effort up to the use of a rolling bearing, which with an increase of the necessary mounting space may lead to a reduced operational strength and/or increased costs due to the high forces acting during operation. On the other hand, with a use of such a pivotable coupling lever, the trajectory of a latching nose of the coupling lever is defined along a circular arc around the pivoting axis.

A coupling device actuated by centrifugal force for a laboratory centrifuge according to the invention for one embodiment has a driving element, which is driven by a motor, and an output element, which is associated with a rotor of the laboratory centrifuge. Furthermore, the coupling device has a coupling element, which is actuated by a coupling force by being moved from a non-coupled position into a coupled position. In the coupled position only a friction-locking or a clamping is possible. It is also possible that in the coupled position a form-locking is caused which may be effective only in axial direction, only in the circumferential direction for transmission of the driving moment or may be effective both axially as well as in the circumferential direction. According to the invention the actuation of the coupling element is achieved through a coupling force which is dependent on a centrifugal force due to the rotating driving element. Preferably the coupling element is pressed against the outer surface of the driving element and/or pressed into a recess or groove of the driving element realized as a driving shaft.

According to the invention it is suggested that a guideway is provided which deflects a centrifugal force of an eccentric mass which generates the (or at least a part of the) coupling force. The guideway may be straight, may have straight parts or may be curved in any way, while the guiding may be realized one-sided or two-sided by the guideway transverse to a guiding direction. The guideway may e. g. be realized as a guiding rail or any guiding surface. While according to prior art a "deflection" of the centrifugal force is achieved by the use of a pivoting lever, according to the invention a deflection is caused by the guideway, in which way different guiding means are employed, the use of a pivot bearing may be unnecessary and the freedom of design may also be enlarged with respect to the characteristic of the deflection. Depending on the inclination of the guideway on the one hand a direction of the centrifugal force into which the centrifugal force is effective may be changed. On the other hand, depending on the design of the contact conditions with the guideway and/or the inclination of the guideway, only a component of the centrifugal force of the eccentric mass may be transmitted or "passed on" under deflection, in which way in the end the dependence of the coupling force from the rotational speed of the rotating driving element may be influenced by the design of the contact conditions with the guideway and by the inclination thereof.

Within the scope of the invention only one single deflection through a guideway may be used. It is also possible, however, that a double or multiple deflection is used by providing at least one further guideway in the region of which the centrifugal force of the eccentric mass, which generates the coupling force, is deflected again. To mention only an example, with a first guideway the centrifugal force of the eccentric mass may be deflected from direction oriented radially outwards into a direction oriented coaxially to the rotational axis of the rotor. Here it is also possible that by the deflection through this guideway only a component of the centrifugal force is transmitted. The remaining centrifugal force is then again deflected with the further guideway into an effective direction oriented radially inwards, which actuates the coupling element radially inwards. Here, too, only a component of the centrifugal force may be transmitted by the further guideway. It is understood that by the deflection by the guideway and/or further guideway an increase of the transmitted centrifugal force is also possible by using a kind of "wedge effect" for the transmission in the region of the guideway.

Within the scope of the invention the eccentric mass or the coupling element or a receiving or transmission body effective in the force flow between the eccentric mass and the coupling element may interact with the guideway and/or the further guideway. This may be achieved with a rolling or sliding contact. For a special suggestion of the invention the eccentric mass is realized as a sphere or roller, which provides a rolling contact with the guideway and/or the further guideway. By the use of a rolling contact, friction can be reduced. Furthermore, by realizing the eccentric mass as a sphere or roller the use of an eccentric mass is possible in an embodiment which may be manufactured in high production numbers, with high precision and possibly also with a hardened outer surface.

In a further embodiment a receiving body is present (in addition to the eccentric mass and possible further transmission bodies). The receiving body receives a centrifugal force which has been deflected by the inclined guideway and has an orientation parallel to the rotational axis. In this case the receiving body is then guided by the further guideway. The further guideway is inclined with respect to the rotational axis of the rotor and with respect to the direction transverse to the rotational axis in such a way that the centrifugal force received by the receiving body oriented parallel to the rotational axis is converted into the coupling force, which biases the coupling element radially inwardly.

It is possible in this respect that the receiving body is realized separately from the coupling element as long as the coupling force generated by the interaction of the receiving body with the further guideway is transmitted from the receiving body to the coupling element (under interposition of a contact surface or further transmission bodies). An especially compact embodiment of the invention results if the receiving body is built by the coupling element itself.

As mentioned in the beginning, the coupling element may interact with the outer surface of the driving element only in a friction-locking way. In a preferred embodiment, however, the coupling element engages form-lockingly with a recess of the driving element, especially with a circumferential groove of a driving shaft.

By pressing the coupling element into the aforementioned recess with the coupling force only the axial securing of the output element, and therefore of the rotor, with respect to the driving element, especially the driving shaft, may be provided. It is also possible that in this way a form-locking in a circumferential direction is provided. In a preferred embodiment of the invention the coupling element and the recess of the driving element interact by contact surfaces. The contact surfaces are inclined in such a way that the coupling force is converted into an axial force component. The output element has a friction surface inclined with respect to the rotational axis, while the driving element has an opposite friction surface inclined correspondingly with respect to the rotational axis. The axial force component presses the friction surface of the output element axially in a mounting direction against the opposite friction surface of the driving element. In this way on the one hand the axial securing in the mounting direction may be enforced and possibly a transmission of the driving moment between the friction surface and the opposite friction surface is also supported by raising the active friction forces.

There are numerous options for the arrangement of the components participating in the force flow between the eccentric mass and the coupling element. These may, for example, be loosely inserted into suitable receptive spaces of the coupling device and the laboratory centrifuge or may be guided in suitable recesses. In a preferred embodiment of the invention the coupling device has an inset retainer which for example is formed integrally or with a base body and a lid. In the inset retainer the eccentric mass, the receiving body, the coupling element and/or a guiding body forming a guiding surface is/are accommodated. It is possible for the inset retainer to form the guiding surface and/or the further guiding surface. Such an inset retainer can therefore be designed and manufactured specifically for the reception of the aforementioned components and/or for forming the guiding surfaces. Possibly the inset retainer with the components accommodated therein also forms a constructive module able to be mounted.

Another solution of the object of the invention is given by a laboratory centrifuge in which a coupling device as explained before is employed.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

In the following, the invention is further explained and described with respect to preferred exemplary embodiments illustrated in the drawings.

DETAILED DESCRIPTION

Figure 1:
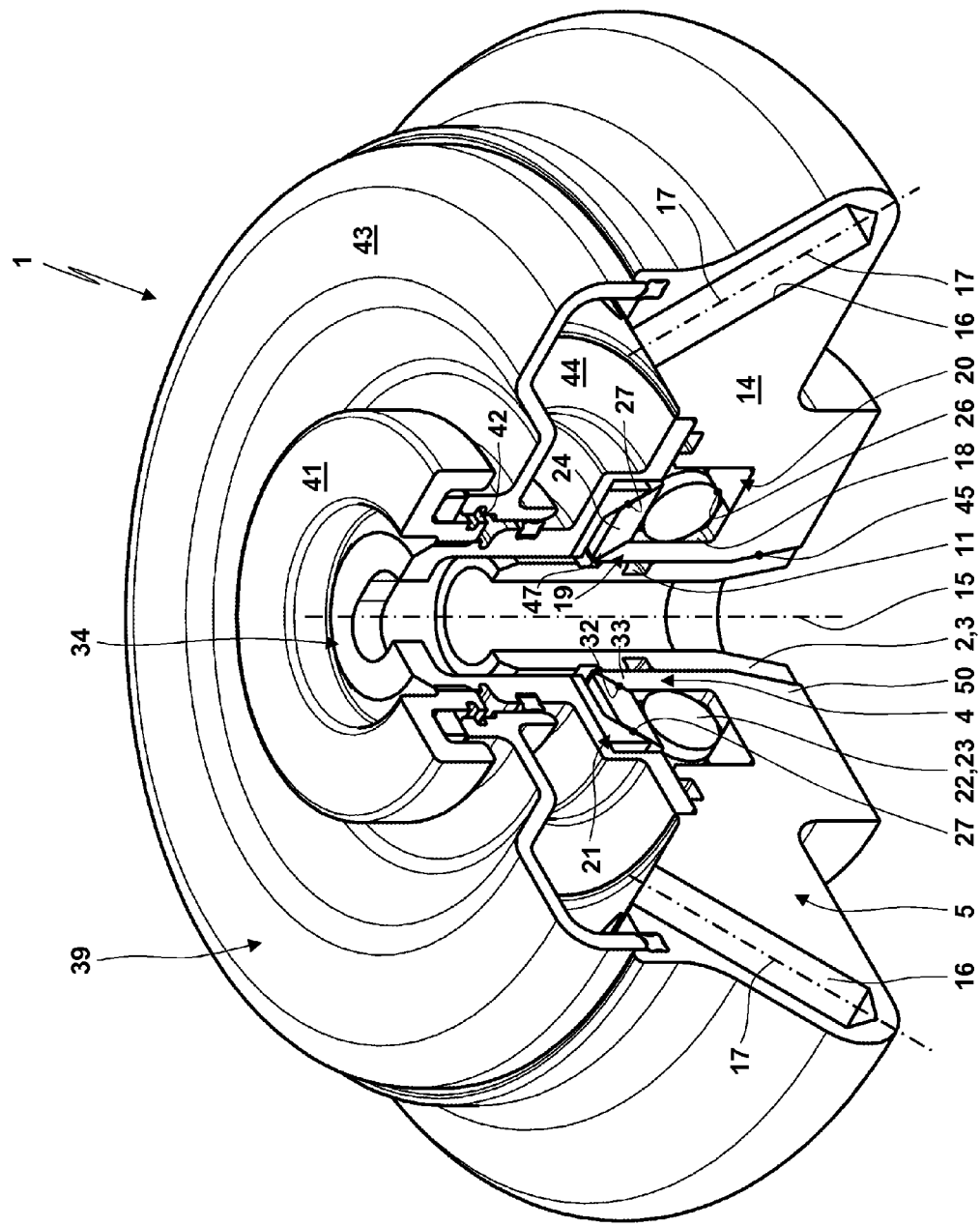
FIG. 1 shows a partial section of a part of a laboratory centrifuge with an unlocked configuration of the rotor in a three-dimensional view.

Referring now in greater detail to the drawings, FIGS. 1 to 5 illustrate a part of a laboratory centrifuge 1. The laboratory centrifuge 1 has a driving element 2 realized as a driving shaft 3 and an output element 50 coupled to the driving element 2 through a coupling device 4 realized by a rotor 5. For simplification, further parts of the laboratory centrifuge 1, especially a motor, control electronics and an interface with a display and input elements as well as a housing to be closed with a lid are not shown.

Figure 5:
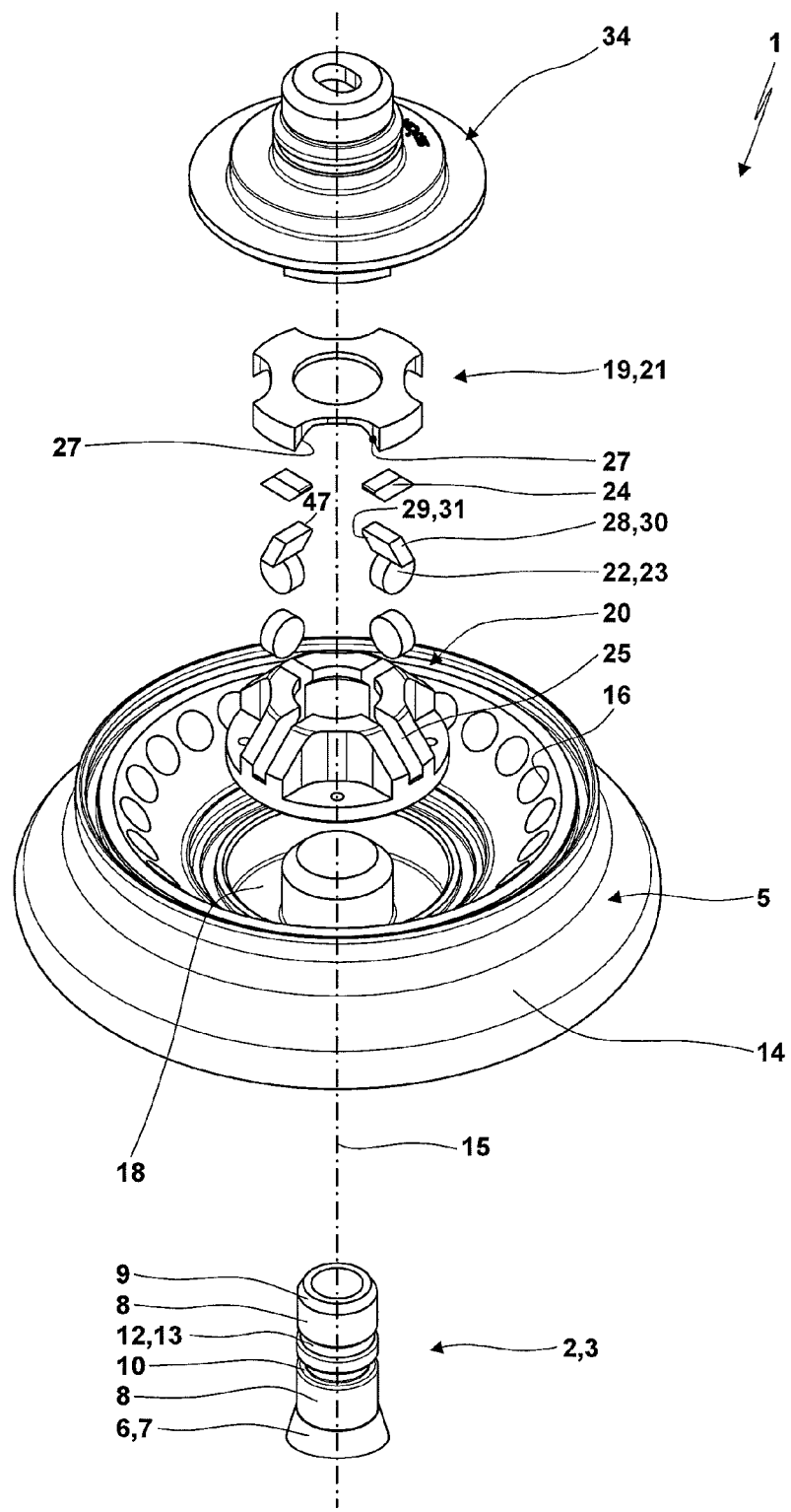
FIG. 5 in an exploded view shows the part of the laboratory centrifuge according to FIGS. 1 to 4.

For the embodiment shown, the driving shaft 3 is realized as a hollow shaft (cp. FIG. 5). The driving shaft 3 has a partial lateral surface 6 in the shape of a truncated cone with which an opposite friction surface 7 is realized. In an upward direction, that is in the direction of the interior of the rotor 5, the partial lateral surface merges into a cylindrical partial lateral surface 8 of the driving shaft 3. On its front side the cylindrical partial lateral surface 8 merges into an insertion slope 9. In the partial lateral surface 8 there is a circumferential groove 10 in which an elastic sealing element 11 is placed. Furthermore, the partial outer surface 8 has a recess 12, here a circumferential groove 13, by which the coupling of the driving shaft 3 with the rotor 5 is achieved in a way further specified in the following.

The rotor 5 comprises a base body 14 which in a rough approximation is plate-shaped. Evenly distributed over its circumference in the base body 14 several receptacles 16 for containers not shown here containing the substances to be centrifuged are distributed with an equal distance to a longitudinal and rotational axis 15. The longitudinal axes 17 of the receptacles 16 are aligned with the longitudinal and rotational axis 15 and to planes comprising the corresponding radial direction and are inclined under an acute angle with respect to the longitudinal and rotational axis 15.

Figure 6:
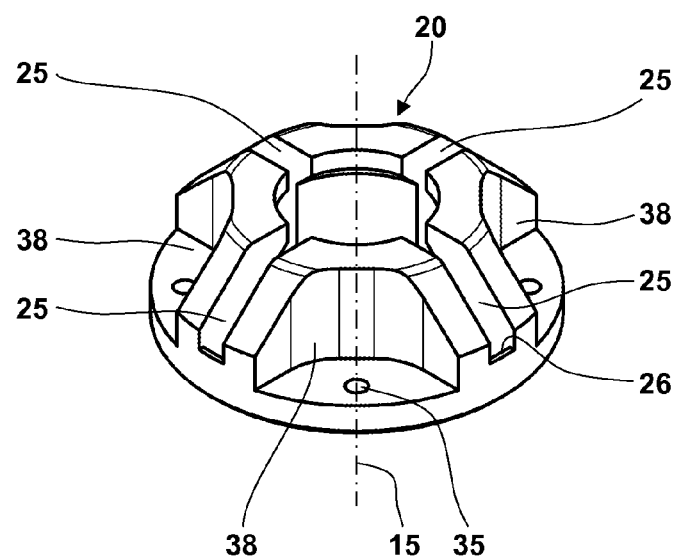
FIG. 6 in a three-dimensional view diagonally from above shows a base body of an inset retainer.

The base body 14 forms a ring chamber 18 being open to the top and extending coaxially to the longitudinal and rotational axis 15. As can especially be seen from FIG. 5, into this ring chamber 18 an inset retainer 19 is inserted from the top. The inset retainer 19 is formed with a base body 20 and a covering body 21. Between the base body 20 and the covering body 21 in the inset retainer 19 four eccentric masses 22, which here are realized as rollers 23, and four coupling elements 24 are accommodated evenly distributed in a circumferential direction. The base body 20 of the inset retainer 19 has four slits 25 distributed evenly over the circumference, which extend in planes oriented radially (FIG. 6). In each of those slits 25 a roller 23 and a coupling element 24 are guided in such a way that the roller 23 can execute a rolling motion to be further described in the slit 25 having small play in the circumferential direction, and the coupling element 24 can be slid along in the slit 25 also with small play in the circumferential direction. In the bottom region the base body 20 forms a guideway 26, which for the given embodiment is formed by a plain guiding plane and is inclined with respect to a plane transverse to the longitudinal axis 15 by an angle of approx. 25 to 60°, preferably 30 to 50° or 45° increasing towards the top when looking radially outwards. In contact with each of the guideways 26 of the slits 25 there is a roller 23 (FIG. 1). The covering body 21 is set onto the base body 20 from the top in such a way that the slits 25 are closed from above by the covering body 21. The covering body 21 in the region of the boundary of each of the slits 25 forms further guideways 27. In the plane transverse to the longitudinal axis 15 the coupling elements 24 have a rectangular cross section, while in a radial plane including the longitudinal axis 15 they are trapezoidal in a rough approximation where two sides of the trapezoid are each arranged in a plane transverse to the longitudinal axis 15. The other side surfaces 28, 29 form guide surfaces 30, 31, which are inclined corresponding to the inclination of the further guideways 27. The coupling elements 24 are guided in the slits 25 on the further guideway 27 with the guiding surface 31 lying radially outwards and on a further inclined guideway 32 with the guiding surface 30 lying radially inwards in such a way that the coupling element 24 can only move in parallel to the further guideways 27, 32 (i.e. only in the direction of the longitudinal and rotational axis 15 if at the same time there is a motion in parallel to the longitudinal and rotational axis). For the embodiment shown the further guideway 32 is realized by an inclined front surface of a sleeve-like circumferential wall 33 of the base body 14.

For the rotor 5 at rest due to their weight the coupling elements 24 rest from the top against the corresponding rollers 23. In this non-coupled position shown in FIG. 2, the rollers 23 rest against the outer lateral surface of the wall 33, the guideways 26 of the base body 20 and the lower side of the coupling elements 24.

Figure 7:
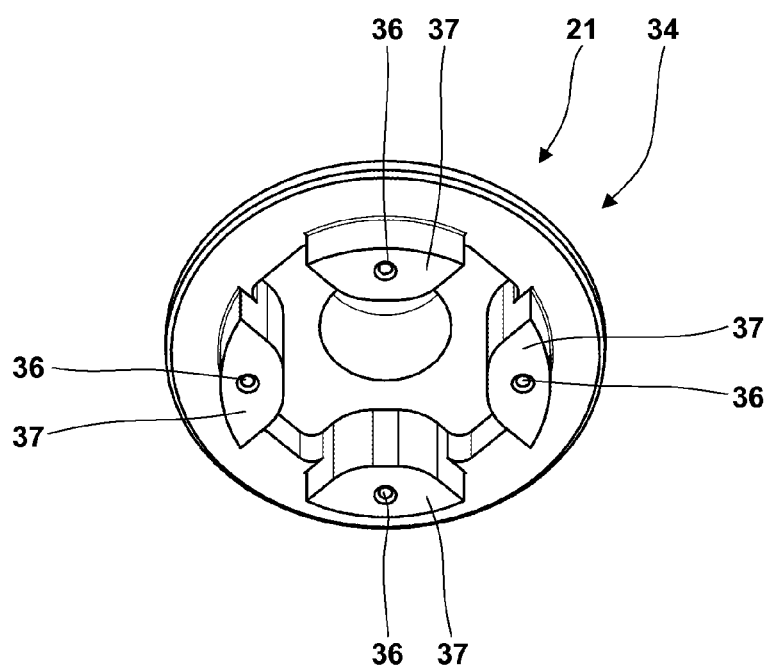
FIG. 7 in a three-dimensional view diagonally from below shows a closing lid.

The inset retainer 19 formed with the base body 20 and the covering body 21 with the rollers 23 and coupling elements 24 placed within it is axially secured and braced by a closing lid 34 shown in FIG. 7. As can be seen especially from FIG. 4, to achieve this the closing lid is attached to the base body 14 of the rotor by a screw connection extending from the bottom side through the base body 14 through a bore 35 of the base body 20 into a threaded bore 36 of the closing lid 34 with the inset retainer 19 caught in between. The closing lid 34 forms four protrusions 37 distributed over the circumference which are accommodated without play in corresponding recesses 38 of the base body 20 of the inset retainer 19.

Under provision of a sealing against fluids, a housing lid 39 is screwed onto the base body 14 with a screw connection 40 with the closing lid 36. For the embodiment shown, the housing lid 39 is formed in several parts with a housing nut 41 and a lid part 43 connected to the housing nut 41 through a non-unlockable latching element 42. Between the base body 14, the lid part 43 and the closing lid 34 a reception space 44 extending along the whole circumference around the longitudinal and rotational axis 15 and being sealed against fluids is defined, into which the receptacles 16 open.

The laboratory centrifuge functions as follows:

For the rotor 5 removed from the driving shaft 3 as a first step the housing lid 39 is removed by loosening the screw connection 40, so that the receptacles 16 are openly accessible and in these containers with the substance to be centrifuged may be arranged. By screwing tight the screw connection 40, the housing lid 39 is subsequently fixed to the base body 14 of the rotor 5. With this, the reception space 44 is sealed against fluids.

Now the rotor 5 is set onto the driving shaft 3 from above under coaxial orientation of the longitudinal axes. The driving shaft 3 enters so far into the interior of the rotor 5 that a friction surface 45 in the shape of a truncated cone of the base body 14 of the rotor 5 comes into contact with the opposite friction surface 7 of the driving shaft 3 with preferably its full surface. Due to the weight of the rotor 5 a friction force is generated in the friction contact between friction surface 45 and opposite friction surface 7.

If the driving shaft 3 is driven by the motor of the laboratory centrifuge 1, the rotational motion of the driving shaft 3 is transmitted onto the rotor 5 through the friction contact between the friction surface 45 and the opposite friction surface 7, while the contact between the friction surface 45 and the opposite friction surface 7 forms a kind of sliding clutch. As the rotational speed of the rotor 5 increases, an increasing centrifugal force 46 acts on the eccentric masses 22 formed by the rollers 23. This results in the rollers 23 moving rollingly along the guideways 26, which on the one hand results in the rollers 23 moving further radially outwards and on the other hand in a lifting motion of the rollers 23 in parallel to the longitudinal and rotational axis 15 occurring together with this radial motion. This lifting motion of the rollers 23 results in the coupling elements 24, which rest against the top of the rollers 23, being forced upwards with a lifting force $F_H$ due to the centrifugal force. Due to the guidance of the coupling elements 24 by the further guideways 27, 32, the upwards motion of the rollers 23 is converted into a motion of the coupling elements 24 in parallel to the further guideways 27, 32. Therefore, the rolling motion of the rollers 23 along the guideways 26 of the base body 20 of the inset retainer 19 causes a motion of the coupling elements 24 with a motion component which is oriented upwards parallel to the longitudinal axis 15 and a motion component which is oriented radially inwards towards the longitudinal and rotational axis 15. The latter motion component results in the coupling element 24 entering into the recess 12 or groove 13 of the driving shaft 3 with its latching nose 47 placed radially inwards, in which way an axial form-locking is caused. The coupling force $F_{KK}$ with which the latching nose 47 of the coupling elements 24 is pressed into the groove 13 of the driving shaft 3 depends on the centrifugal force 46 (i.e. the rotational speed of the rotor 5) as well as the deflection and the components of the centrifugal force 46 relevant for generating the lifting force $F_H$ on the roller 23 due to the inclined guideway 26 as well as on the coupling force $F_{KK}$ oriented radially inwards, which is generated from the aforementioned lifting force $F_H$ as a force component on the further guideways 27, 32.

It is possible that the latching nose 47 only provides an axial securing of the rotor 5 with respect to the driving shaft 3, thus forming a locking which avoids the rotor 5 unintentionally detaching from the opposite friction surface 7 of the driving shaft 3. Preferably, however, the groove 13 and the latching noses 47 of the coupling elements 24 in their contact areas each have contact surfaces inclined with respect to the plane transverse to the longitudinal axis 15. Due to the inclination of the contact surfaces, the coupling force $F_{KK}$ applied by the coupling element 24 leads to an axial force component which increases the contact force of the friction surface 45 with the opposite friction surface 7 according to the rotational speed.

In the context of the description and the claims occasionally the "centrifugal force of the eccentric mass" being deflected by the guideway 26 and the further guideways 27, 32 or the centrifugal force acting on the roller 23, the coupling element 24 or the latching nose 47 and the groove 13 is mentioned. Strictly speaking, this is not the centrifugal force, but a force (component) $F_H$, $F_{KK}$ (correspondingly larger or smaller) which depends on the centrifugal force, which is generated by deflection by a guideway 26, 27 and the absolute value of which results from the corresponding geometrical conditions. In the region of the friction surface 45 the base body 14 of the rotor 5 forms the output element 50.

Figure 2:
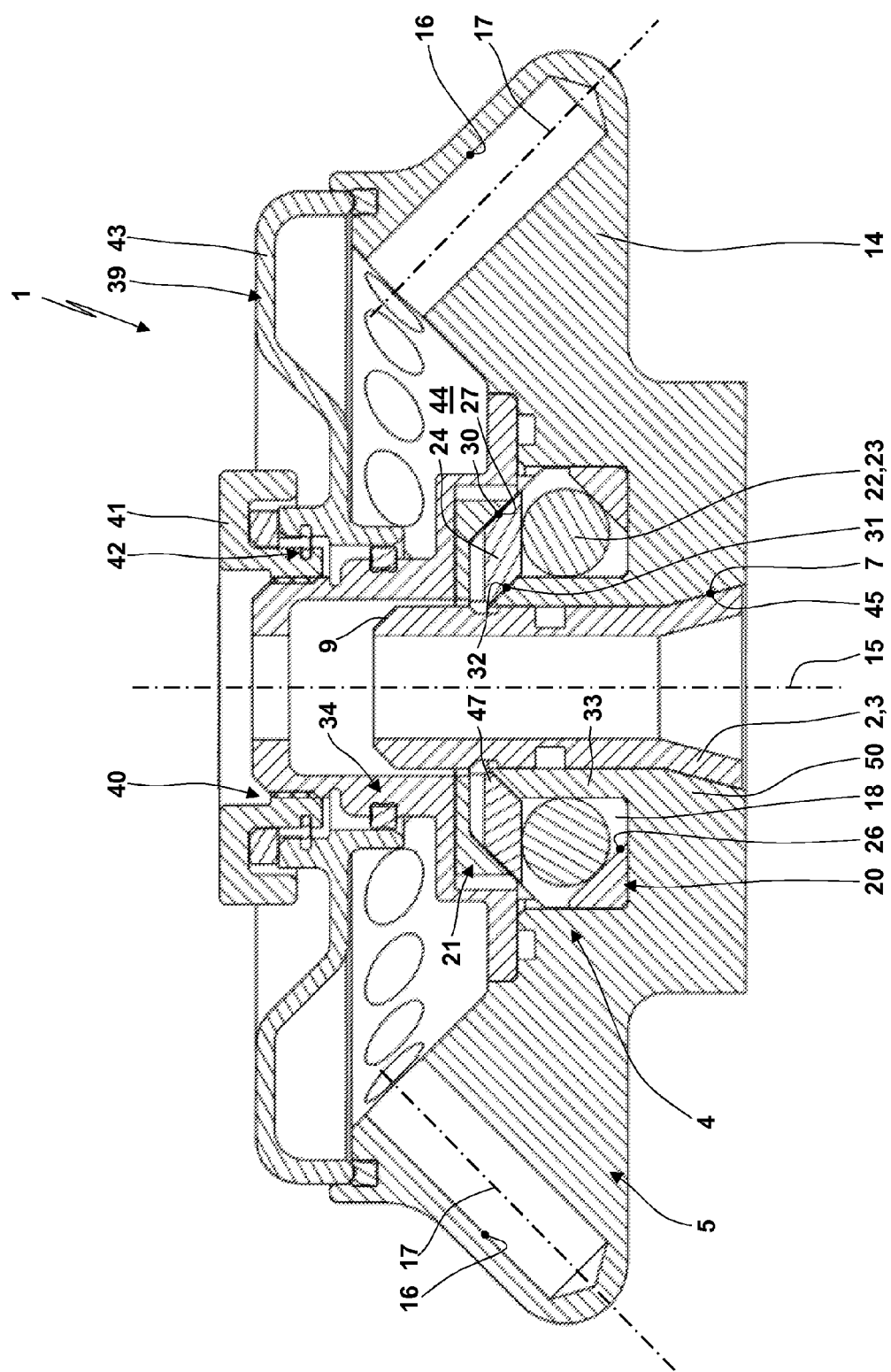
FIG. 2 shows the part of the laboratory centrifuge according to FIG. 1 in an unlocked configuration of the rotor in a longitudinal section.
Figure 3:
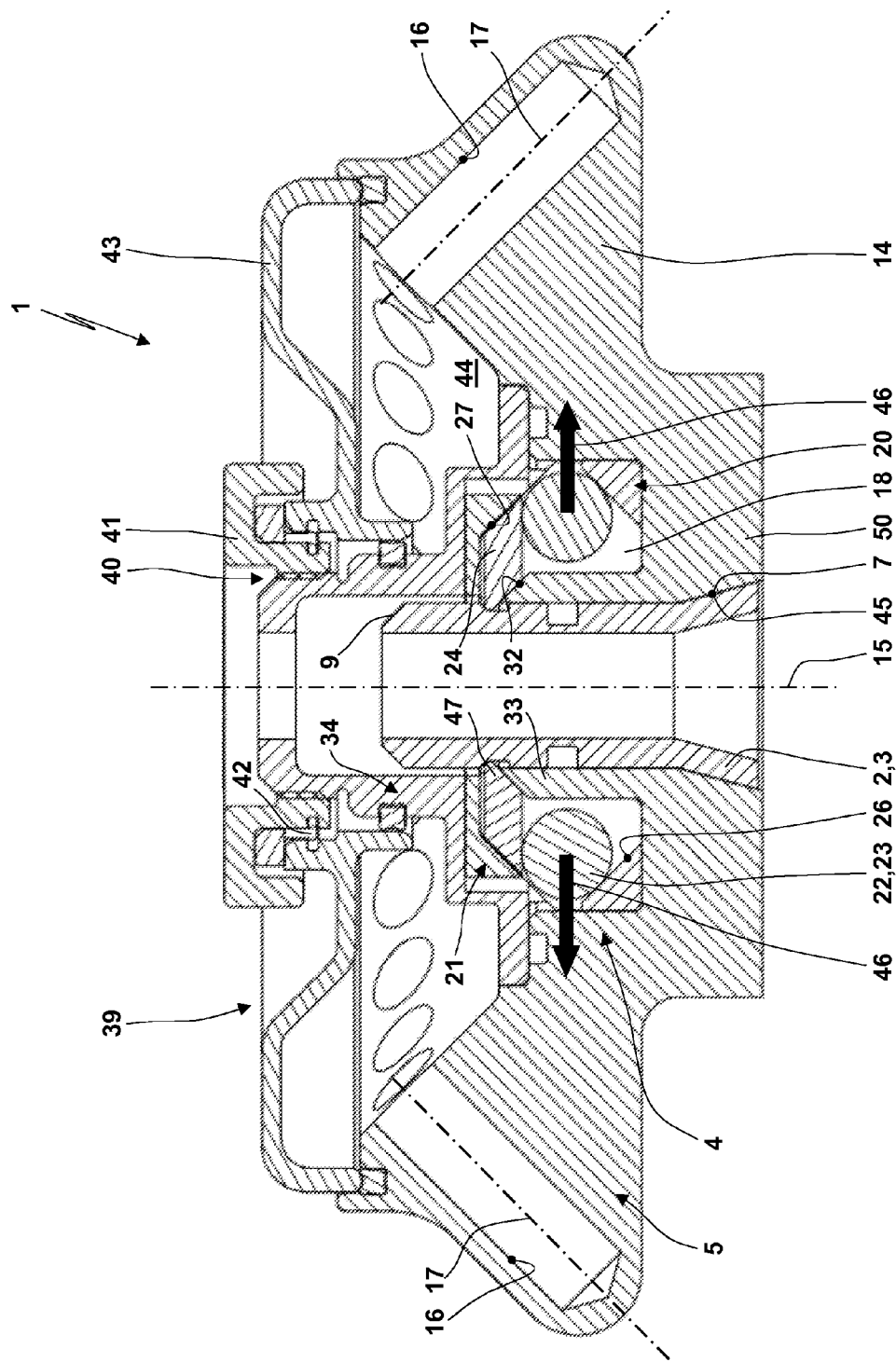
FIG. 3 shows the part of the laboratory centrifuge according to FIG. 1 in a locked configuration of the rotor in a longitudinal section.
Figure 4:
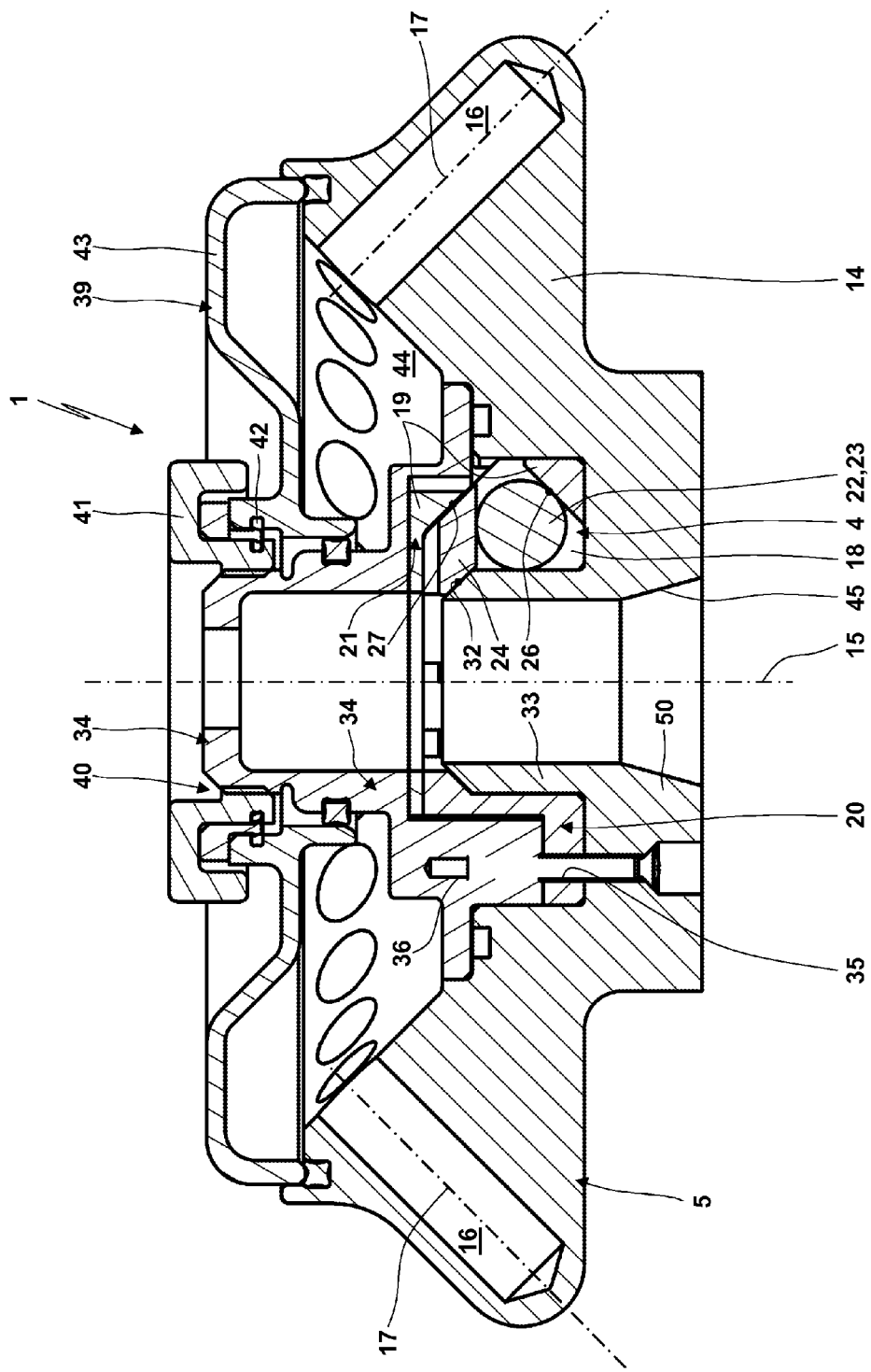
FIG. 4 shows the part of the laboratory centrifuge according to FIG. 1 in an unlocked configuration of the rotor in a different longitudinal section.

When the laboratory centrifuge 1 stops after finishing the centrifuging, due to their weight the coupling elements 24 and the rollers 23 move back from the coupled position according to FIG. 3 to the decoupled position according to FIG. 2. To ensure this, the inclination angle of the guideway 26 and the further guideway 27, 32 as well as that of the contact surface between the coupling element 24 and the recess 12 or groove 13 of the driving shaft 3 are preferably chosen smaller than a self-locking angle. In this way with the rotor 5 at rest the rotor 5 can be lifted upwards and away from the driving shaft 3 without further measures and especially without actuating a manual unlocking element.

Figure 8:
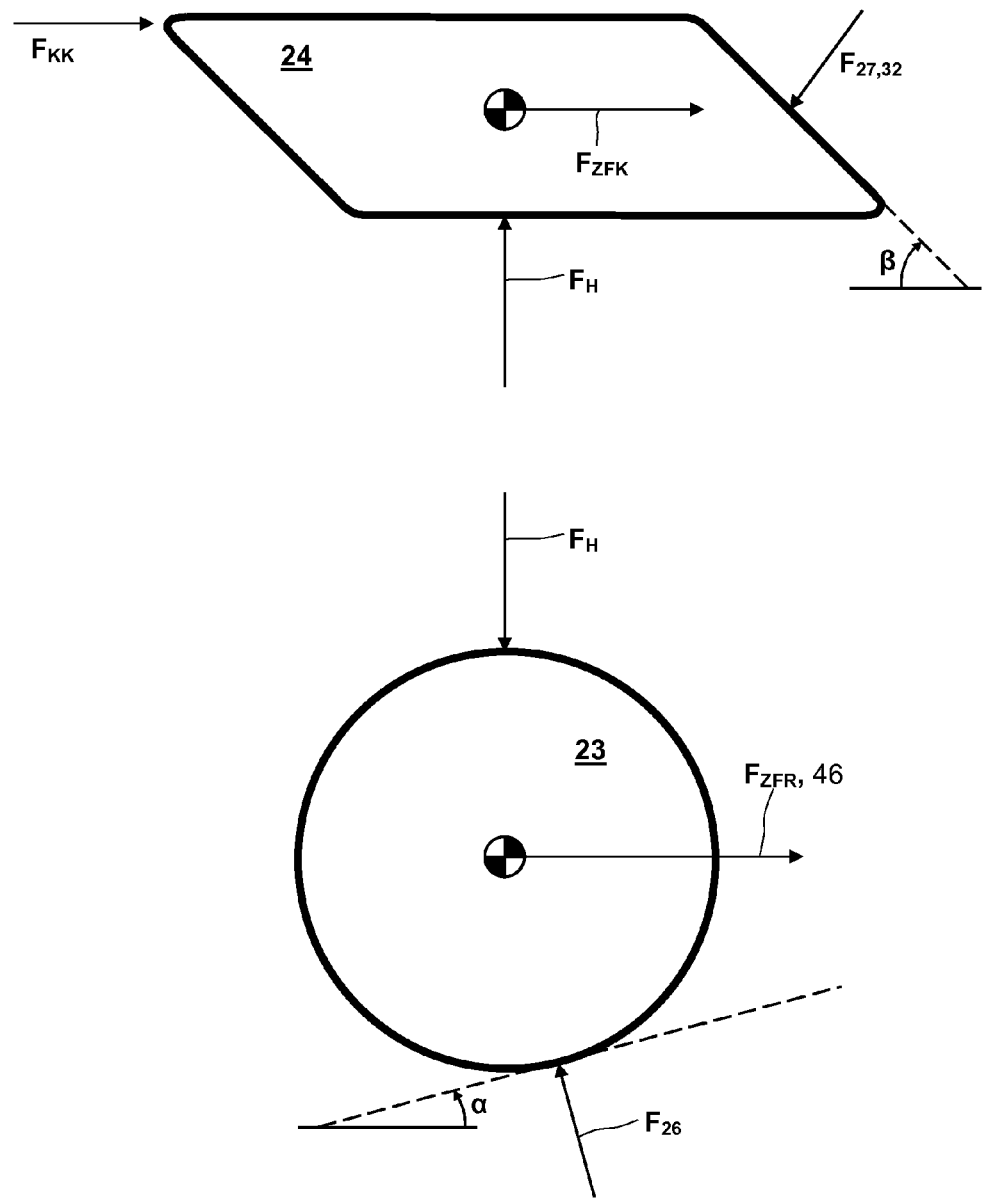
FIG. 8 shows a free body diagram of an eccentric mass realized as a roller and a coupling element of a coupling device.

FIG. 8 shows a free body diagram of the roller 23 and the coupling element 24 for the embodiment according to FIGS. 1 to 7:

A centrifugal force $F_{ZFR}$ (reference sign 46 in FIG. 3) acts on roller 23. The centrifugal force $F_{ZFR}$ results from the product of the mass of the roller 23, the distance of the center of gravity of the roller 23 from the rotational axis 15 and the square of the angular velocity of the rotor 5. Furthermore, the lifting force $F_H$ exerted on the coupling element 24 and a force $F_{26}$ exerted on the roller 23 by the guideway 26 act on the roller 23. If $\alpha$ denotes the angle of the guideway 26 with respect to a transverse plane to the rotational axis 15, then the force $F_H$ results from $F_H = F_{ZFR}/\tan \alpha$.

On the one hand, a centrifugal force $F_{ZFK}$ resulting from the product of the mass of the coupling element, the distance of the center of gravity of the coupling element 24 from the rotational axis 15 and the square of the angular velocity of the rotor 5 acts on the coupling element 24. Furthermore, the lifting force $F_H$, a force $F_{27,32}$ exerted onto the coupling element 24 by the further guideway 27, 32 and the coupling force $F_{KK}$ acting between the coupling element 24 and the groove 13 of the driving shaft 3 act on the coupling element 24. If the angle $\beta$ describes the inclination of the further guideway 27, 32 with respect to a transverse plane to the rotational axis 15, from the free body diagram according to FIG. 8 it follows that the coupling force $F_{KK}$ results from $F_{KK} = F_H \tan \beta - F_{ZFK}$, so that $$F_{KK} = F_{ZFR}(\tan \beta / \tan \alpha) - F_{ZFK}$$

holds.

From the above it can be seen that to cause a coupling force as large as possible it is necessary that the influence of the mass of the coupling element 24 and the distance of the center of gravity of the coupling element 24 from the rotational axis 15 should be smaller than the influence of the mass of the roller 23 and the distance of the center of gravity of the roller 23 from the rotational axis 15.

Figure 9:
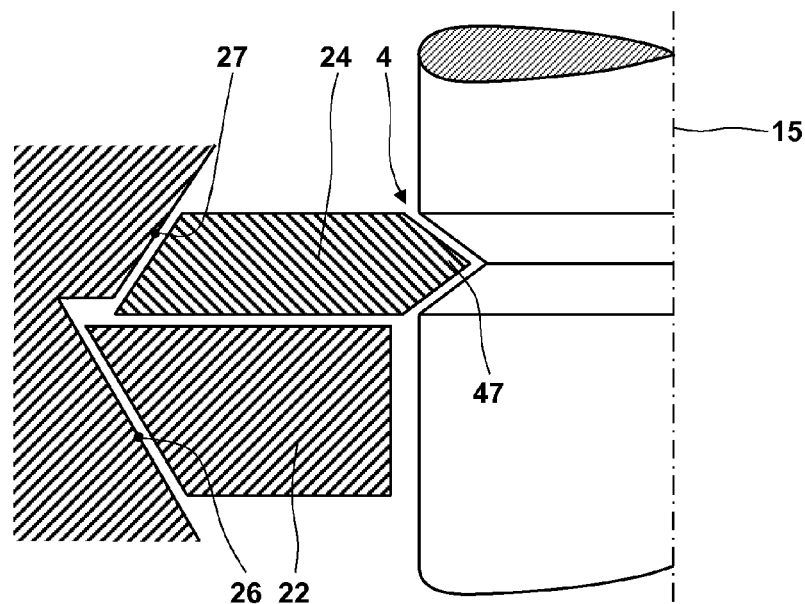
FIGS. 9 to 13 show further coupling devices in a schematic view.

FIGS. 9 to 13 in a highly schematized way show further embodiments of a coupling device 4:

For the embodiment according to FIG. 9 the eccentric mass 22 forms a sliding contact with the guideway 26. The lifting motion of the eccentric mass 22 is also transmitted to the coupling element 24 through a sliding contact. Finally, the coupling element 24 also forms a sliding contact with the further guideway 27, 32. As the rotational speed of the rotor 5 increases, the eccentric mass 22 migrates radially outwards while the coupling element 24 is moved radially inwards with a sliding relative motion between the eccentric mass 22 and the coupling element 24.

Figure 10:
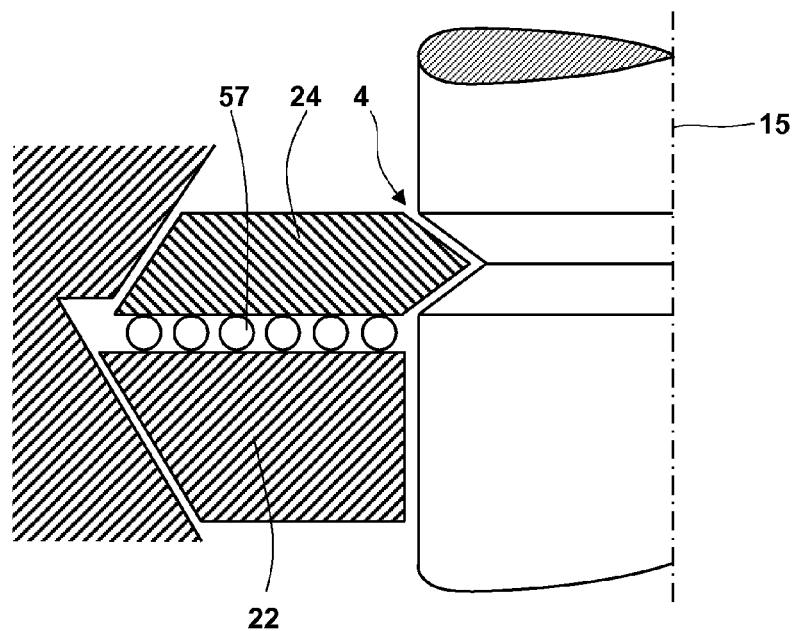

For the embodiment shown in FIG. 10 a rolling bearing 57 is placed between the eccentric mass 22 and the coupling element 24 (with the way of functioning being the same as in FIG. 9 apart from that).

Figure 11:
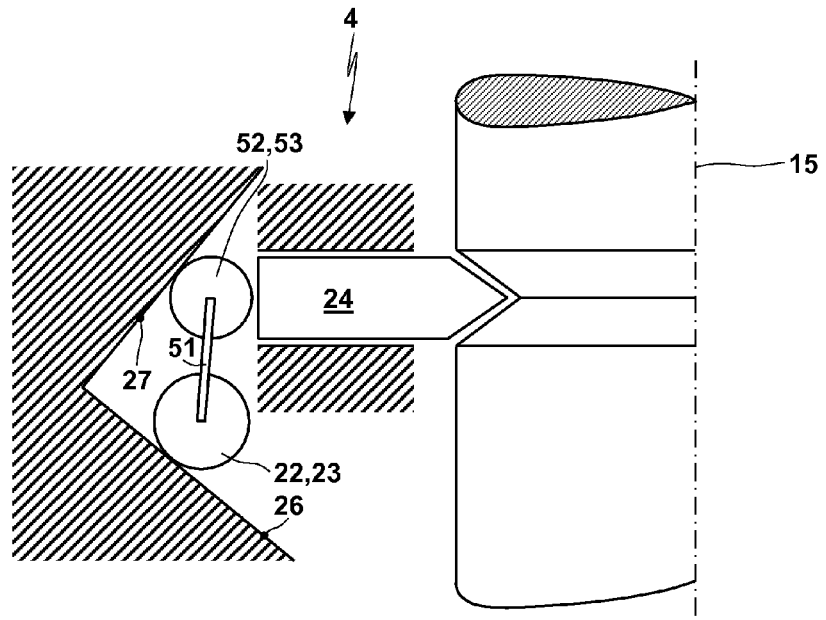

According to FIG. 11, the eccentric mass 22 is realized as roller 23 which rolls on the guideway 26 and is coupled with an receiving body 52 by a cage 51. The receiving body 52 is here also realized as a roller 53. The roller 53 rolls along the further guideway 27. At the same time, the roller 53 rests against the coupling element 24 and exerts pressure on it radially inwards towards the rotational axis 15.

Figure 12:
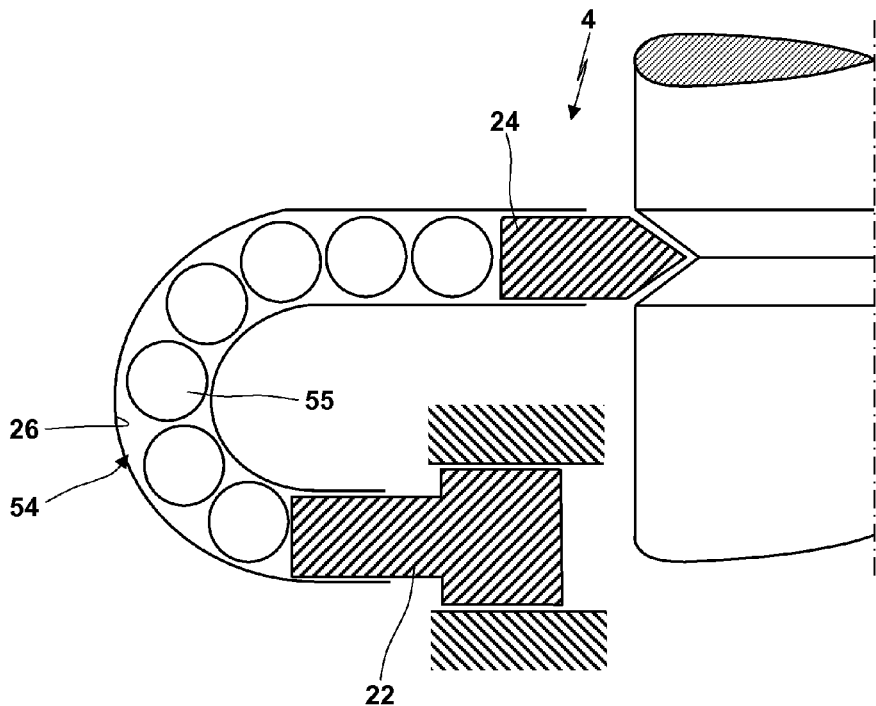

For the embodiment shown in FIG. 12, between the eccentric mass 22, here guided slidingly, and the coupling element 24 a deflecting transmission device 54 guided through a guideway 26 is inserted. For the embodiment shown, the transmission device 54 is formed with rolling bodies 55 guided in a channel or tube along the guideway 26.

Figure 13:
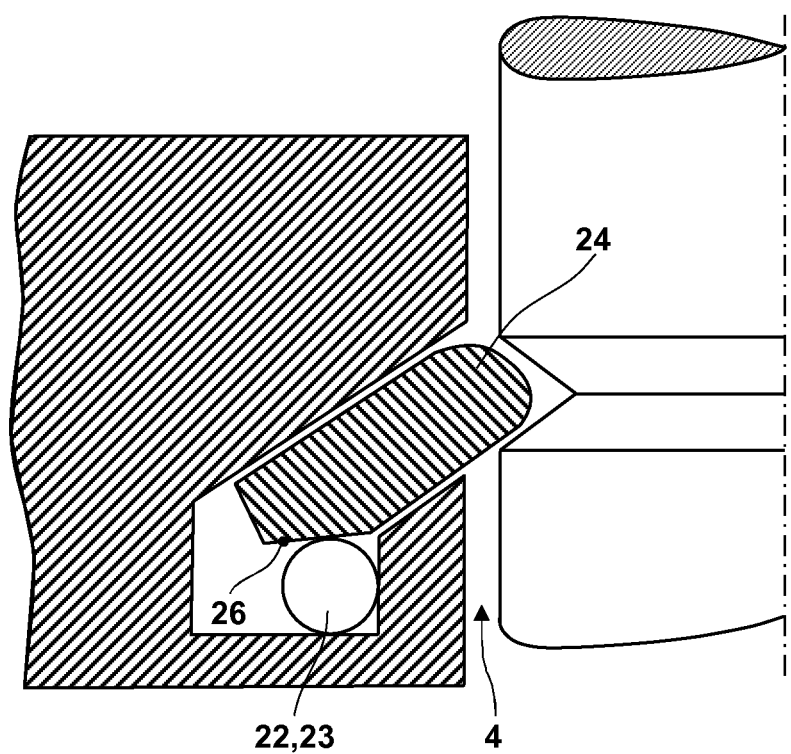

According to FIG. 13 the eccentric mass 22 is realized as a roller 23. Here, the guideway 26 is formed directly by the coupling body 24.

Many variations and modifications may be made to the preferred embodiments of the invention without departing substantially from the spirit and principles of the invention. All such modifications and variations are intended to be included herein within the scope of the present invention, as defined by the following claims.

I claim:

1. A coupling device for a laboratory centrifuge actuated by centrifugal force comprising
   a) a driving element driven by a motor,
   b) an output element drivingly connected to a rotor of the laboratory centrifuge,
   c) said driving element and said output element rotating about a common rotational axis,
   d) a coupling element for releasably coupling the driving element with the output element,
   e) an eccentric mass being located remote from the axis of rotation, rotating together with the driving element or the output element, formed separately from the coupling element and generating a centrifugal force,
   f) said coupling element being actuated via a force flow between the eccentric mass and the coupling element by a coupling force which is dependent on the centrifugal force generated by the eccentric mass,
   g) a guideway interposed in the force flow between the eccentric mass and the coupling element, said guideway establishing a rolling contact with the eccentric mass and deflecting the centrifugal force of the eccentric mass, wherein the eccentric mass is built by a sphere or roller.

2. The coupling device according to claim 1, wherein another guideway which once more deflects the centrifugal force of the eccentric mass is provided in the force flow between the eccentric mass and the coupling element.

3. The coupling device according to claim 2, wherein the guideway is inclined at least in a partial region with respect to the centrifugal force acting on the eccentric mass, so that a force component $F_H$ is generated
   a) the absolute value of which depends on the centrifugal force acting on the eccentric mass and
   b) which has an orientation parallel to the rotational axis.

4. The coupling device according to claim 3, wherein the force component $F_H$ generated by the inclined guideway is converted into a force component $F_{KK}$ by the other guideway, said force component $F_{KK}$ biasing the coupling element in a radially inward direction.

5. The coupling device according to claim 4, wherein a receiving body is provided, which receives the centrifugal force deflected by the inclined guideway into a force component $F_H$ having an orientation parallel to the rotational axis, while the receiving body is guided by the other guideway, which is inclined with respect to the rotational axis and to the direction perpendicular to the rotational axis in such a way that the coupling force $F_{KK}$ biasing the coupling element in a radially inward direction is generated.

6. The coupling device according to claim 5, wherein the receiving body is formed by the coupling element.

7. The coupling device according to claim 6, wherein an inset retainer is provided,
   a) wherein the eccentric mass and the receiving body forming the coupling element are accommodated and
   b) which forms the guideway.

8. The coupling device according to claim 5, wherein an inset retainer is provided,
   a) wherein the eccentric mass, the receiving body and the coupling element are accommodated and
   b) which forms the guideway.

9. The coupling device according to claim 1, wherein the guideway is inclined at least in a partial region with respect to the centrifugal force acting on the eccentric mass, so that a force component $F_H$ is generated
   a) the absolute value of which depends on the centrifugal force acting on the eccentric mass and
   b) which has an orientation parallel to the rotational axis.

10. The coupling device according claim 1, wherein the coupling element engages in a form-locking way with a recess or groove of the driving element.

11. The coupling device according to claim 10, wherein the coupling element and the recess or groove of the driving element interact by contact surfaces, where the contact surfaces are inclined in such a way that the coupling force is converted into an axial force component which axially presses the output element with a friction surface against an opposite friction surface of the driving element.

12. A laboratory centrifuge with a coupling device according to claim 1.

13. A coupling device for a laboratory centrifuge actuated by centrifugal force comprising
   a) a driving element driven by a motor,
   b) an output element drivingly connected to a rotor of the laboratory centrifuge,
   c) said driving element and said output element rotating about a common rotational axis,
   d) a coupling element for releasably coupling the driving element with the output element,
   e) an eccentric mass being located remote from the axis of rotation, rotating together with the driving element or the output element, formed separately from the coupling element and generating a centrifugal force,
   f) said coupling element being actuated via a force flow between the eccentric mass and the coupling element by a coupling force which is dependent on the centrifugal force generated by the eccentric mass,
   g) a guideway interposed in the force flow between the eccentric mass and the coupling element, said guideway establishing a sliding contact with the eccentric mass and deflecting the centrifugal force of the eccentric mass, wherein the eccentric mass is a sliding body which forms a sliding contact with the guideway, the guideway being inclined such that the sliding movement of the eccentric mass along the guideway results in the eccentric mass moving radially outwards and in a lifting movement of the eccentric mass parallel to the rotational axis, wherein the lifting movement of the eccentric mass is transmitted to the coupling element through a sliding contact.

14. The coupling device according to claim 13, wherein another guideway which once more deflects the centrifugal force of the eccentric mass is provided in the force flow between the eccentric mass and the coupling element.

15. The coupling device according to claim 14, wherein the guideway is inclined at least in a partial region with respect to the centrifugal force acting on the eccentric mass, so that a force components $F_H$ is generated
   a) the absolute value of which depends on the centrifugal force of acting on the eccentric mass and
   b) which has an orientation parallel to the rotational axis.

16. The coupling device according to claim 15, wherein the force component $F_H$ generated by the inclined guideway is converted into a force component $F_{KK}$ by the other guideway, said force component $F_{KK}$ biasing the coupling element in a radially inward direction.

17. The coupling device according to claim 13, wherein the guideway is inclined at least in a partial region with respect to the centrifugal force acting on the eccentric mass, so that a force component $F_H$ is generated
   a) the absolute value of which depends on the centrifugal force acting on the eccentric mass and
   b) which has an orientation parallel to the rotational axis.

18. The coupling device according claim 13, wherein the coupling element engages in a form-locking way with a recess or groove of the driving element.

19. The coupling device according to claim 18, wherein the coupling element and the recess or groove of the driving element interact by contact surfaces, where the contact surfaces are inclined in such a way that the coupling force is converted into an axial force component which axially presses the output element with a friction surface against an opposite friction surface of the driving element.

20. A laboratory centrifuge with a coupling device according to claim 13.

* * * * *